United States Patent
Mukherjee et al.

(10) Patent No.: US 8,438,362 B2
(45) Date of Patent: May 7, 2013

(54) AUTOMATICALLY RECLAIMING MEMORY SPACE

(75) Inventors: Anirban Mukherjee, West Bengal (IN); Anindya Banerjee, Pune (IN); Daniel James Fillingham, Lancashire (GB)

(73) Assignee: Symantec Corporation, Mountain View, CA (US)

( * ) Notice: Subject to any disclaimer, the term of this patent is extended or adjusted under 35 U.S.C. 154(b) by 496 days.

(21) Appl. No.: 12/816,075

(22) Filed: Jun. 15, 2010

(65) Prior Publication Data

US 2011/0307529 A1    Dec. 15, 2011

(51) Int. Cl.
*G06F 12/00*    (2006.01)

(52) U.S. Cl.
USPC .................... 711/170; 711/117; 711/159

(58) Field of Classification Search .............. None
See application file for complete search history.

(56) References Cited

U.S. PATENT DOCUMENTS 7,822,939 B1 *    10/2010    Veprinsky et al. ............ 711/162

* cited by examiner

*Primary Examiner* — Shawn X Gu
(74) *Attorney, Agent, or Firm* — Wilmer Cutler Pickering Hale and Dorr LLP

(57) ABSTRACT

A method, in one embodiment, can include determining whether an administrative task for a file system is to be performed within a thin storage memory array. Furthermore, if the administrative task for the file system is to be performed, a determination is made as to whether memory space is freed up while performing the administrative task. If memory space is freed up while performing the administrative task, a determination is made as to whether the freed up memory space satisfies a predefined contiguous memory space threshold. If the predefined contiguous memory space threshold is satisfied by the freed up memory space, a determination is made as to whether a memory space reclamation process is to be performed. If the memory space reclamation process is to be performed, the freed up memory space is reclaimed from the file system.

20 Claims, 9 Drawing Sheets

AUTOMATICALLY RECLAIMING MEMORY SPACE

BACKGROUND

Within the conventional technology, thin provisioning storage is utilized to increase the usage of storage devices. However, there are disadvantages associated with this technique. For example, within conventional thin storage that is implemented as a large system, a free memory space reclaim operation can take a long amount of time just to determine the free memory spaces that can potentially be reclaimed from one or more file systems.

SUMMARY

A method, in one embodiment, can include determining whether an administrative task for a file system is to be performed within a thin storage memory array. Furthermore, if the administrative task for the file system is to be performed, a determination is made as to whether memory space is freed up while performing the administrative task. If memory space is freed up while performing the administrative task, a determination is made as to whether the freed up memory space satisfies a predefined contiguous memory space threshold. If the predefined contiguous memory space threshold is satisfied by the freed up memory space, a determination is made as to whether a memory space reclamation process is to be performed. If the memory space reclamation process is to be performed, the freed up memory space is reclaimed from the file system.

Additionally, in one embodiment, the method further comprising: if the predefined contiguous memory space threshold is not satisfied by the freed up memory space, determining whether the freed up memory space is at or above a predefined percentage of the predefined contiguous memory space threshold. In an embodiment, the method further comprising: if the freed up memory space is at or above a predefined percentage of the predefined contiguous memory space threshold, relocating data stored in memory space located adjacent to the freed up memory space to satisfy the predefined contiguous memory space threshold. It is pointed out that in one embodiment, the method further comprising: if memory space is freed up while performing the administrative task, determining whether there is a free memory space adjoining the freed up memory space. In an embodiment, the method further comprising: if there is a free memory space adjoining the freed up memory space, including the adjoining free memory space with the freed up memory space. Additionally, in one embodiment, the administrative task can be selected from a group that includes resizing the file system, defragmenting the file system, removing a file from the file system, removing a file set from the file system, removing a clone from the file system, removing a snapshot from the file system, moving a file out of the file system within a Hierarchical Storage Management (HSM) environment, and moving a file of the file system from a thin tier to a non-thin tier within a Dynamic Storage Tiering (DST) environment. In addition, in an embodiment, the administrative task is selected from a group consisting of compressing a file of the file system and compacting a directory of the file system. Furthermore, in one embodiment, the file system can be a log structured file system and the administrative task can include running a garbage collector within the log structured file system.

In another embodiment, a computer readable storage medium has stored thereon, computer-executable instructions that when executed by a computing device cause the computing device to perform a method. The method can include determining whether an administrative task for a file system is to be performed within a thin storage memory array. Moreover, if the administrative task for the file system is to be performed, a determination is made as to whether memory space is freed up while performing the administrative task. If memory space is freed up while performing the administrative task, a determination is made as to whether the freed up memory space satisfies a predefined contiguous memory space threshold. If the predefined contiguous memory space threshold is satisfied by the freed up memory space, a determination is made as to whether a memory space reclamation process is to be performed. If the memory space reclamation process is to be performed, the freed up memory space is reclaimed from the file system.

It is noted that in one embodiment, the method further comprising: if the predefined contiguous memory space threshold is not satisfied by the freed up memory space, determining whether the freed up memory space is at or above a predefined percentage of the predefined contiguous memory space threshold. In an embodiment, the method further comprising: if the freed up memory space is at or above a predefined percentage of the predefined contiguous memory space threshold, relocating data stored in memory space located adjacent to the freed up memory space to satisfy the predefined contiguous memory space threshold. Note that in one embodiment, the method further comprising: if memory space is freed up while performing the administrative task, determining whether there is a free memory space adjoining the freed up memory space. In an embodiment, the method further comprising: if there is a free memory space adjoining the freed up memory space, including the adjoining free memory space with the freed up memory space. Additionally, in one embodiment, the administrative task can be selected from a group that includes resizing the file system, defragmenting the file system, removing a file from the file system, removing a file set from the file system, removing a clone from the file system, removing a snapshot from the file system, moving a file out of the file system within a HSM environment, and moving a file of the file system from a thin tier to a non-thin tier within a DST environment. Moreover, in an embodiment, the administrative task is selected from a group consisting of compressing a file of the file system and compacting a directory of the file system. Additionally, in one embodiment, the file system can be a log structured file system and the administrative task can include running a garbage collector within the log structured file system.

In yet another embodiment, a computer system includes a processor and computer readable storage media coupled to the processor and having stored therein instructions that, if executed by the computer system cause the computer system to execute a method. The method can include determining whether an administrative task for a file system is to be performed within a thin storage memory array. Additionally, if the administrative task for the file system is to be performed, a determination is made as to whether memory space is freed up while performing the administrative task. If memory space is freed up while performing the administrative task, a determination is made as to whether the freed up memory space satisfies a predefined contiguous memory space threshold. If the predefined contiguous memory space threshold is satisfied by the freed up memory space, a determination is made as to whether a memory space reclamation process is to be performed. If the memory space reclamation process is to be performed, the freed up memory space is reclaimed from the file system.

It is pointed out that in an embodiment, the method further comprising: if the predefined contiguous memory space threshold is not satisfied by the freed up memory space, determining whether the freed up memory space is at or above a predefined percentage of the predefined contiguous memory space threshold. In an embodiment, the method further comprising: if the freed up memory space is at or above a predefined percentage of the predefined contiguous memory space threshold, relocating data stored in memory space located adjacent to the freed up memory space to satisfy the predefined contiguous memory space threshold. It is noted that in an embodiment, the method further comprising: if memory space is freed up while performing the administrative task, determining whether there is a free memory space adjoining the freed up memory space. In an embodiment, the method further comprising: if there is a free memory space adjoining the freed up memory space, including the adjoining free memory space with the freed up memory space. Additionally, in one embodiment, the administrative task can be selected from a group that includes resizing the file system, defragmenting the file system, removing a file from the file system, removing a file set from the file system, removing a clone from the file system, removing a snapshot from the file system, moving a file out of the file system within a HSM environment, and moving a file of the file system from a thin tier to a non-thin tier within a DST environment. Additionally, in one embodiment, the administrative task is selected from a group consisting of compressing a file of the file system and compacting a directory of the file system. Furthermore, in one embodiment, the file system can be a log structured file system and the administrative task can include running a garbage collector within the log structured file system.

While particular embodiments in accordance with the invention have been specifically described within this Summary, it is noted that the invention and the claimed subject matter are not limited in any way by these embodiments.

BRIEF DESCRIPTION OF THE DRAWINGS

The accompanying drawings, which are incorporated in and form a part of this specification and in which like numerals depict like elements, are included for exemplary illustration of principles of the present embodiments and are not intended to limit the invention to the particular implementations illustrated therein. The drawings referred to in this description should not be understood as being drawn to scale except if specifically noted.

DETAILED DESCRIPTION

Figure 1:
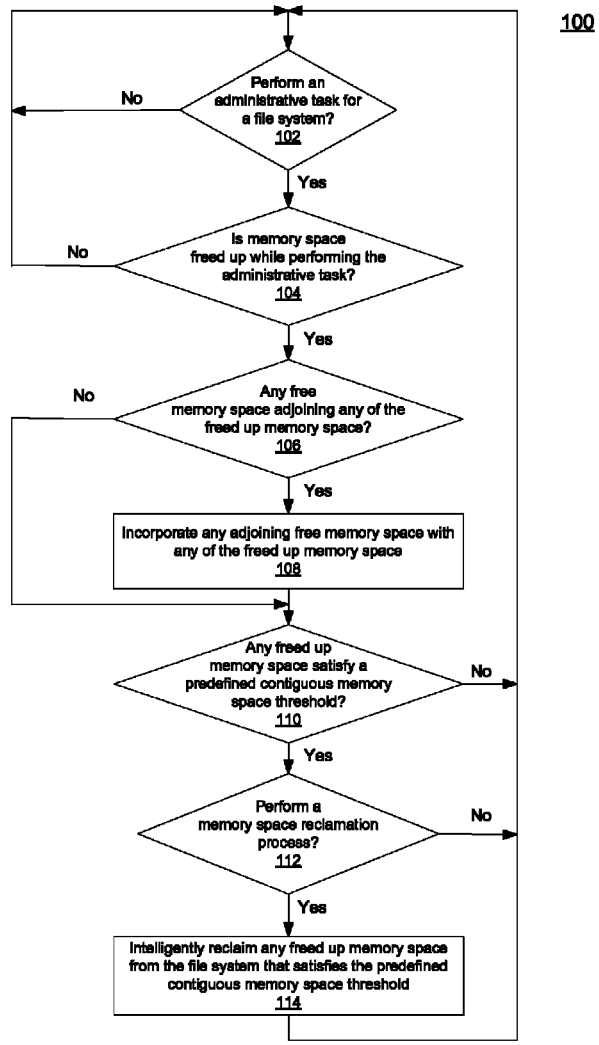
FIG. 1 is a flow diagram of method in accordance with various embodiments of the present disclosure.

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications, and equivalents, which may be included within the scope of the invention as construed according to the appended Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "determining," "performing," "removing," "reclaiming," "accessing," "moving," "selecting," "sending," "monitoring," "updating," "instructing," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated present systems and methods can be implemented in a variety of architectures and configurations. For example, present systems and methods can be implemented as part of a distributed computing environment, a cloud computing environment, a client server environment, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

FIG. 1 is a flow diagram of an example method (or process) 100 in accordance with various embodiments of the present disclosure for automatically reclaiming memory space after a file system administrative task. Although specific operations are disclosed in flow diagram 100, such operations are examples. Method 100 may not include all of the operations illustrated by FIG. 1. Also, method 100 may include various other operations and/or variations of the operations shown by FIG. 1. Likewise, the sequence of the operations of flow diagram 100 can be modified. It is appreciated that not all of the operations in flow diagram 100 may be performed. In various embodiments, one or more of the operations of method 100 can be controlled or managed by software, by firmware, by hardware, or by any combination thereof, but is not limited to such. Method 100 can include processes of embodiments which can be controlled or managed by a processor(s) and electrical components under the control of computer or computing device readable and executable instructions (or code). The computer or computing device readable and executable instructions (or code) may reside, for example, in data storage features such as computer or computing device usable volatile memory, computer or computing device usable non-volatile memory, and/or computer or computing device usable mass data storage. However, the computer or computing device readable and executable instructions (or code) may reside in any type of computer or computing device readable medium.

In one embodiment, within a thin storage memory array that allows free memory space reclamation, there are some file system tasks or operations like defragmentation, resize, deleting large files, and the like which potentially can free up (or coalesce) large amounts of free memory space. During these file system operations, the file system has the knowledge of which memory areas are freed up. This file system information can be utilized by an embodiment in accordance with the present disclosure to intelligently issue a reclaim command on just the freed up memory areas. One of the benefits of this approach is the ability to reclaim a sizable portion of memory from the thin storage memory array within a relatively brief amount of time. In an embodiment in accordance with the present disclosure, a user of the file system can specify whether he or she wants it to perform a reclamation operation or process after an administrative task.

Specifically, method 100 can include determining whether an administrative task is to be performed for a file system within a thin storage memory array. If not, the determination can be repeated. However, if it is determined that an administrative task is to be performed for a file system within the thin storage memory array, a determination can be made automatically as to whether memory space is freed up (or coalesced) while performing the administrative task. If it is determine that no memory space was freed up while performing the administrative task, method 100 can repeat the determination of whether an administrative task is to be performed for a file system within the thin storage memory array. However, if it is determined that memory space was freed up while performing the administrative task, a determination can be made as to whether there are any free (or available) memory space adjoining any of the freed up memory space. If not, a determination can be made as to whether any freed up memory space satisfies a predefined contiguous memory space threshold. However, if it is determined that there are free memory space adjoining any of the freed up memory space, any adjoining free memory space can be incorporated (or included) with any of the freed up memory space. After which, the determination can be made as to whether any freed up memory space satisfies the predefined contiguous memory space threshold. If not, method 100 can repeat the determination of whether an administrative task is to be performed for a file system within the thin storage memory array.

However, if it is determined that any freed up memory space satisfies the predefined contiguous memory space threshold, a determination can be made as to whether a memory space reclamation process is to be performed after the administrative task. If not, method 100 can repeat the determination of whether an administrative task is to be performed for a file system within the thin storage memory array. However, if it is determined that a memory space reclamation process is to be performed after the administrative task, the freed up memory space that satisfied the predefined contiguous memory space threshold can be intelligently reclaimed from the file system within the thin storage memory array. In this manner, freed up memory space can be automatically reclaimed after a file system administrative task in accordance with various embodiments of the present disclosure.

At operation 102 of FIG. 1, a determination can be made as to whether an administrative task or operation is to be performed for a file system within a thin storage memory array (also known as a thin provisioning storage memory array). If not, method 100 proceeds to repeat operation 102. However, if it is determined at operation 102 that an administrative task or operation for a file system is to be performed within the thin storage memory array, method 100 can proceed to operation 104.

It is pointed out that operation 102 can be implemented in a wide variety of ways. For example in one embodiment, the administrative task or operation for the file system can include, but is not limited to, resizing the file system, defragmenting the file system, removing one or more files from the file system, removing one or more file sets from the file system, removing one or more clones from the file system, removing one or more file snapshots from the file system, removing one or more file system snapshots from the file system, moving one or more files of the file system from a thin tier to a non-thin tier within a Dynamic Storage Tiering (DST) environment, moving one or more files out of the file system within a Hierarchical Storage Management (HSM) environment, archiving one or more files of the file system within an archival environment; compressing one or more files of the file system, deduplication of one or more files of the file system, compacting one or more directories of the file system, and running a garbage collector within a log structured file system like ZFS™ by Sun Microsystems or Write Anywhere File Layout (WAFL). Furthermore, in one embodiment, the file system can be a log structured file system as previously mentioned, but not limited to such. Additionally, note that the deletion of large files can free up a large amount of contiguous free memory space within the file system. In addition, deletion of a large number of small files within the file system can also free up a large amount of contiguous free memory space which can be reclaimed by method 100. Operation 102 can be implemented in any manner similar to that described herein, but is not limited to such.

At operation 104 of FIG. 1, a determination can be made automatically as to whether memory space is freed up (or coalesced) while performing the administrative task. If not, method 100 can proceed to repeat operation 102. However, if it is determined at operation 104 that memory space was freed up while performing the administrative task, method 100 can proceed to operation 106. Note that the operation 104 can be implemented in a wide variety of ways. For example, operation 104 can be implemented in any manner similar to that described herein, but is not limited to such.

At operation 106, a determination can be made as to whether there are any free (or available) memory space adjoining (or adjacent to) any of the freed up memory space. If not, method 100 can proceed to operation 110. However, if it is determined at operation 106 that there are free memory space adjoining any of the freed up memory space, method 100 can proceed to operation 108. It is noted that operation 106 can be implemented in a wide variety of ways. For example, operation 106 can be implemented in any manner similar to that described herein, but is not limited to such.

At operation 108 of FIG. 1, any adjoining (or adjacent) free memory space can be incorporated (or included) with any of the freed up memory space. Note that operation 108 can be implemented in a wide variety of ways. For example in one embodiment, at operation 108 any adjoining free (or available) memory space can be considered part of any of the freed up memory space. In an embodiment, at operation 108 any adjoining free memory space can be combined or summed with (and considered part of) any of the freed up memory space. Operation 108 can be implemented in any manner similar to that described herein, but is not limited to such.

At operation 110, a determination can be made as to whether any freed up memory space satisfies a predefined contiguous memory space threshold. If not, method 100 can proceed to operation 102. However, if it is determined at operation 110 that any freed up memory space satisfies the predefined contiguous memory space threshold, method 100 can proceed to operation 112. It is pointed out that any of the freed up memory space that satisfies the predefined contiguous memory space threshold at operation 110 may include adjoining free memory space that was included with any of the freed up memory space at operation 108. It is noted that operation 110 can be implemented in a wide variety of ways. For example in one embodiment, the predefined contiguous memory space threshold can be established at any value of memory space. Operation 110 can be implemented in any manner similar to that described herein, but is not limited to such.

At operation 112 of FIG. 1, a determination can be made as to whether a memory space reclamation process is to be performed after the administrative task or operation. If not, method 100 can proceed to operation 102. However, if it is determined at operation 112 that a memory space reclamation process is to be performed after the administrative task, method 100 can proceed to operation 114. It is noted that operation 112 can be implemented in a wide variety of ways. For example in an embodiment, a computer system can produce and present an interface at operation 112 to a user thereby enabling him or her to decide whether a memory space reclamation process is to be performed after the administrative task or operation.

Figure 2:
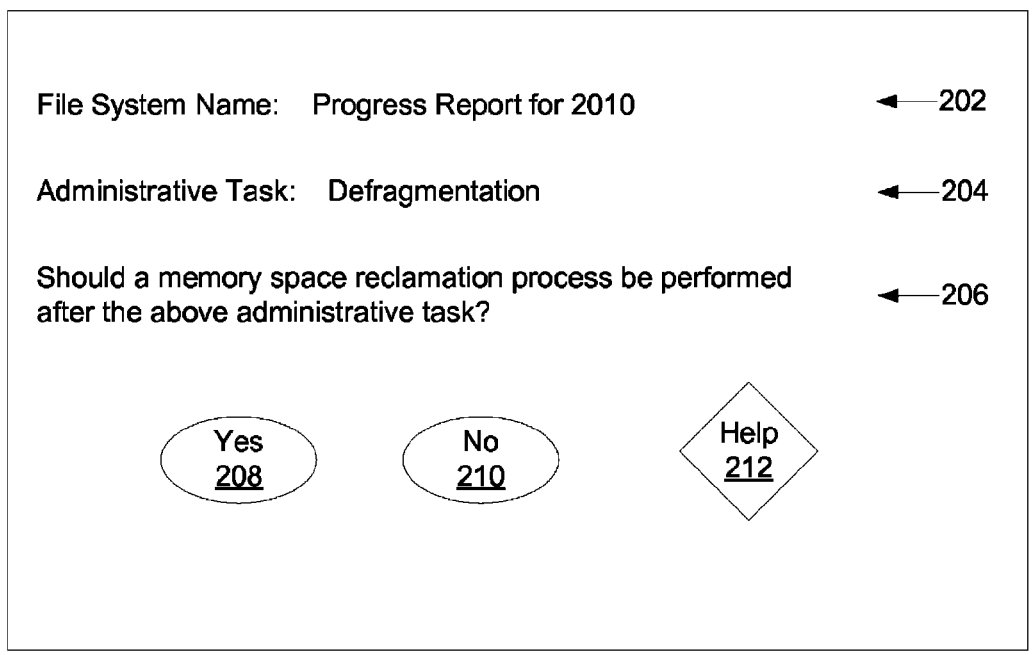
FIG. 2 is a block diagram depicting an example graphical user interface (GUI) in accordance with various embodiments of the present disclosure.

For instance, FIG. 2 is a block diagram depicting an example graphical user interface (GUI) 200 in accordance with various embodiments of the present disclosure that can be produced at operation 112. The graphical user interface 200 can include and display, but is not limited to, the file system name 202 associated with method 100, the administrative task or operation 204 associated with method 100, along with the question 206 that asks a user whether a memory space reclamation process is to be performed after the administrative task. In addition, the graphical user interface 200 can include and display, but is not limited to, a "Yes" button 208, a "No" button 210, and a "Help" button 212 for receiving input from the user. It is pointed out that in one embodiment, if the user selects the "Help" button 212, more information associated with the question 206 can be produced and displayed to the user. It is noted that operation 112 can be implemented in any manner similar to that described herein, but is not limited to such.

At operation 114 of FIG. 1, the freed up memory space that satisfies the predefined contiguous memory space threshold can be intelligently reclaimed from the file system within the thin storage memory array. It is pointed out that the freed up memory space that satisfies the predefined contiguous memory space threshold at operation 114 may include adjoining free memory space that was included with any of the freed up memory space at operation 108. Note that operation 114 can be implemented in a wide variety of ways. For example in one embodiment, at operation 114 a reclaim command can be intelligently issued on just the freed up memory space or areas. In an embodiment, at operation 114 a disk area or storage Application Programming Interface (API) can be invoked to specifically reclaim the freed up memory space that satisfies the predefined contiguous memory space threshold. Operation 114 can be implemented in any manner similar to that described herein, but is not limited to such. After the completion of operation 114, method 100 can proceed to operation 102. In this manner, freed up memory space can be automatically reclaimed after a file system administrative task in accordance with various embodiments of the present disclosure.

Figure 3:
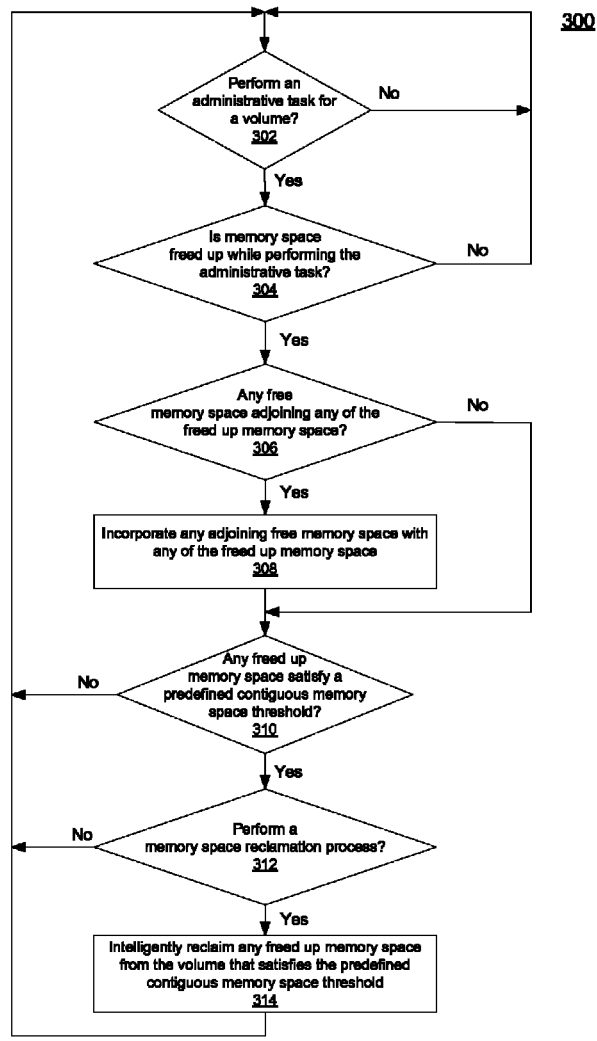
FIG. 3 is a flow diagram of another method in accordance with various embodiments of the present disclosure.

FIG. 3 is a flow diagram of an example method (or process) 300 in accordance with various embodiments of the present disclosure for automatically reclaiming memory space after a volume administrative task. Although specific operations are disclosed in flow diagram 300, such operations are examples. Method 300 may not include all of the operations illustrated by FIG. 3. Also, method 300 may include various other operations and/or variations of the operations shown by FIG. 3. Likewise, the sequence of the operations of flow diagram 300 can be modified. It is appreciated that not all of the operations in flow diagram 300 may be performed. In various embodiments, one or more of the operations of method 300 can be controlled or managed by software, by firmware, by hardware, or by any combination thereof, but is not limited to such. Method 300 can include processes of embodiments which can be controlled or managed by a processor(s) and electrical components under the control of computer or computing device readable and executable instructions (or code). The computer or computing device readable and executable instructions (or code) may reside, for example, in data storage features such as computer or computing device usable volatile memory, computer or computing device usable non-volatile memory, and/or computer or computing device usable mass data storage. However, the computer or computing device readable and executable instructions (or code) may reside in any type of computer or computing device readable medium.

In one embodiment, within a thin storage array that allows free memory space reclamation, there are some volume manager operations like defragmentation, resize, deleting large files, and the like which potentially can free up (or coalesce) large amounts of free memory space. During these volume manager operations, the volume manager has the knowledge of which memory areas are freed up. This volume manager information can be utilized by an embodiment in accordance with the present disclosure to intelligently issue a reclaim command on just the freed up memory areas. One of the benefits of this approach is the ability to reclaim a sizable portion of memory from the thin storage array within a relatively brief amount of time. In an embodiment in accordance with the present disclosure, a user of the volume manager can specify whether he or she wants it to perform a reclamation operation or process after an administrative task.

Specifically, method 300 can include determining whether an administrative task is to be performed for a volume within a thin storage memory array. If not, the determination can be repeated. However, if it is determined that an administrative task is to be performed for a volume within the thin storage memory array, a determination can be made automatically as to whether memory space is freed up (or coalesced) while performing the administrative task. If it is determine that no memory space was freed up while performing the administrative task, method 300 can repeat the determination of whether an administrative task is to be performed for a volume within the thin storage memory array. However, if it is determined that memory space was freed up while performing the administrative task, a determination can be made as to whether there are any free (or available) memory space adjoining any of the freed up memory space. If not, a determination can be made as to whether any freed up memory space satisfies a predefined contiguous memory space threshold. However, if it is determined that there are free memory space adjoining any of the freed up memory space, any adjoining free memory space can be incorporated (or included) with any of the freed up memory space. After which, the determination can be made as to whether any freed up memory space satisfies the predefined contiguous memory space threshold. If not, method 300 can repeat the determination of whether an administrative task is to be performed for a volume within the thin storage memory array.

However, if it is determined that any freed up memory space satisfies the predefined contiguous memory space threshold, a determination can be made as to whether a memory space reclamation process is to be performed after the administrative task. If not, method 300 can repeat the determination of whether an administrative task is to be performed for a volume within the thin storage memory array. However, if it is determined that a memory space reclamation process is to be performed after the administrative task, the freed up memory space that satisfied the predefined contiguous memory space threshold can be intelligently reclaimed from the volume within the thin storage memory array. In this manner, freed up memory space can be automatically reclaimed after a volume administrative task in accordance with various embodiments of the present disclosure.

At operation 302 of FIG. 3, a determination can be made as to whether an administrative task or operation is to be performed for a volume within a thin storage memory array (also known as a thin provisioning storage memory array). If not, method 300 proceeds to repeat operation 302. However, if it is determined at operation 302 that an administrative task or operation for a volume is to be performed within the thin storage memory array, method 300 can proceed to operation 304.

It is pointed out that operation 302 can be implemented in a wide variety of ways. For example in one embodiment, the administrative task or operation for the volume can include, but is not limited to, resizing the volume, deleting the volume, removing one or more volume snapshots. Operation 302 can be implemented in any manner similar to that described herein, but is not limited to such.

At operation 304 of FIG. 3, a determination can be made automatically as to whether memory space is freed up (or coalesced) while performing the administrative task. If not, method 300 can proceed to repeat operation 302. However, if it is determined at operation 304 that memory space was freed up while performing the administrative task, method 300 can proceed to operation 306. Note that the operation 304 can be implemented in a wide variety of ways. For example, operation 304 can be implemented in any manner similar to that described herein, but is not limited to such.

At operation 306, a determination can be made as to whether there are any free (or available) memory space adjoining (or adjacent to) any of the freed up memory space. If not, method 300 can proceed to operation 310. However, if it is determined at operation 306 that there are free memory space adjoining any of the freed up memory space, method 300 can proceed to operation 308. Note that operation 306 can be implemented in a wide variety of ways. For example, operation 306 can be implemented in any manner similar to that described herein, but is not limited to such.

At operation 308 of FIG. 3, any adjoining (or adjacent) free memory space can be incorporated (or included) with any of the freed up memory space. It is noted that operation 308 can be implemented in a wide variety of ways. For example in an embodiment, at operation 308 any adjoining free (or available) memory space can be considered part of any of the freed up memory space. In one embodiment, at operation 108 any adjoining free memory space can be combined or summed with (and considered part of) any of the freed up memory space. Operation 308 can be implemented in any manner similar to that described herein, but is not limited to such.

At operation 310, a determination can be made as to whether any freed up memory space satisfies a predefined contiguous memory space threshold. If not, method 300 can proceed to operation 302. However, if it is determined at operation 310 that any freed up memory space satisfies the predefined contiguous memory space threshold, method 300 can proceed to operation 312. It is pointed out that any of the freed up memory space that satisfies the predefined contiguous memory space threshold at operation 310 may include adjoining free memory space that was included with any of the freed up memory space at operation 308. It is noted that operation 310 can be implemented in a wide variety of ways. For example in an embodiment, the predefined contiguous memory space threshold can be established at any value of memory space. Operation 310 can be implemented in any manner similar to that described herein, but is not limited to such.

At operation 312 of FIG. 3, a determination can be made as to whether a memory space reclamation process is to be performed after the administrative task or operation. If not, method 300 can proceed to operation 302. However, if it is determined at operation 312 that a memory space reclamation process is to be performed after the administrative task, method 300 can proceed to operation 314. It is noted that operation 312 can be implemented in a wide variety of ways. For example in an embodiment, a computer system can produce and present an interface at operation 312 to a user thereby enabling him or her to decide whether a memory space reclamation process is to be performed after the administrative task or operation.

Figure 4:
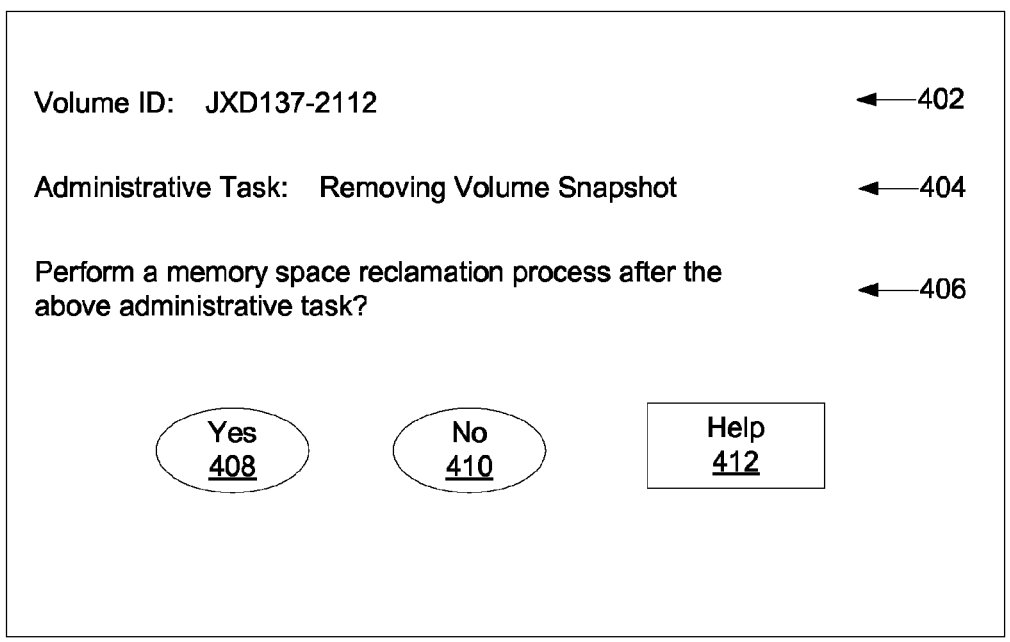
FIG. 4 is a block diagram depicting another example graphical user interface in accordance with various embodiments of the present disclosure.

For instance, FIG. 4 is a block diagram depicting an example graphical user interface (GUI) 400 in accordance with various embodiments of the present disclosure that can be produced at operation 312. The graphical user interface 400 can include and display, but is not limited to, the volume identification (ID) 402 associated with method 300, the administrative task or operation 404 associated with method 300, along with the question 406 that asks a user whether a memory space reclamation process is to be performed after the administrative task. In addition, the graphical user interface 400 can include and display, but is not limited to, a "Yes" button 408, a "No" button 410, and a "Help" button 412 for receiving input from the user. It is pointed out that in one embodiment, if the user selects the "Help" button 412, more information associated with the question 406 can be produced and displayed to the user. It is noted that operation 312 can be implemented in any manner similar to that described herein, but is not limited to such.

At operation 314 of FIG. 3, the freed up memory space that satisfies the predefined contiguous memory space threshold can be intelligently reclaimed from the volume within the thin storage memory array. It is pointed out that the freed up memory space that satisfies the predefined contiguous memory space threshold at operation 314 may include adjoining free memory space that was included with any of the freed up memory space at operation 308. Note that operation 314 can be implemented in a wide variety of ways. For example in an embodiment, at operation 314 a reclaim command can be intelligently issued on just the freed up memory space or areas. In one embodiment, at operation 314 a disk area or storage Application Programming Interface (API) can be invoked to specifically reclaim the freed up memory space that satisfies the predefined contiguous memory space threshold. Operation 314 can be implemented in any manner similar to that described herein, but is not limited to such. After the completion of operation 314, method 300 can proceed to operation 302. In this manner, freed up memory space can be automatically reclaimed after a volume administrative task in accordance with various embodiments of the present disclosure.

Figure 5:
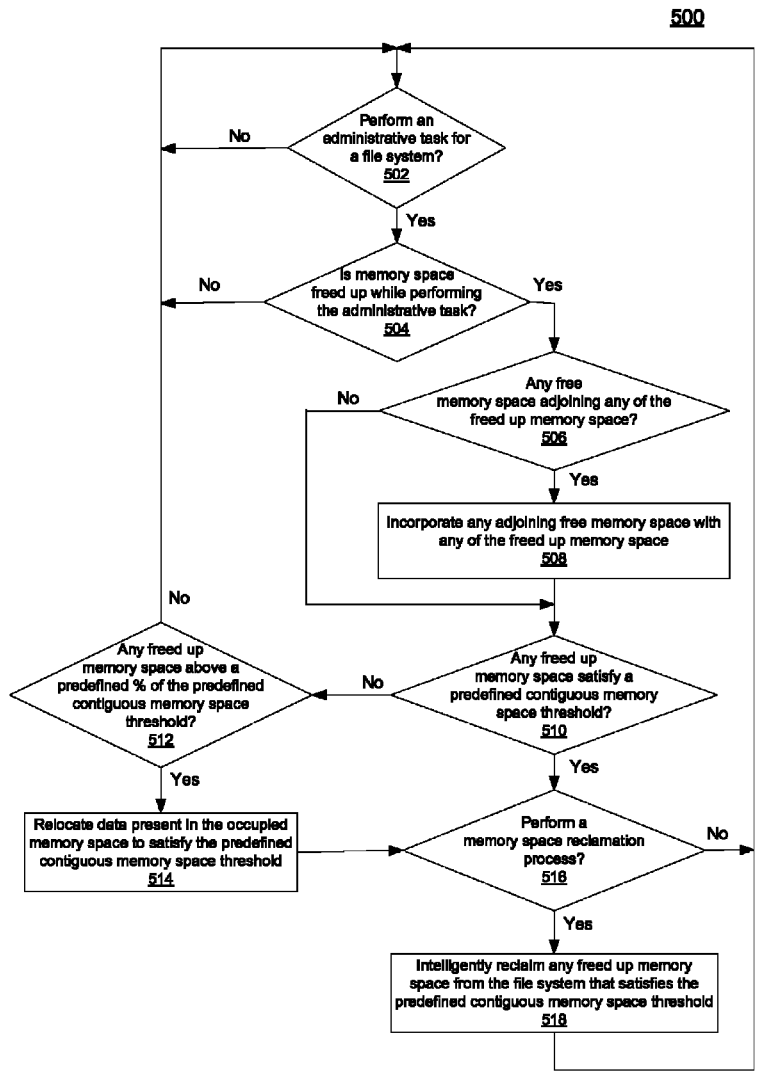
FIG. 5 is a flow diagram of yet another method in accordance with various embodiments of the present disclosure.

FIG. 5 is a flow diagram of an example method (or process) 500 in accordance with various embodiments of the present disclosure for automatically reclaiming memory space after a file system administrative task. Although specific operations are disclosed in flow diagram 500, such operations are examples. Method 500 may not include all of the operations illustrated by FIG. 5. Also, method 500 may include various other operations and/or variations of the operations shown by FIG. 5. Likewise, the sequence of the operations of flow diagram 500 can be modified. It is appreciated that not all of the operations in flow diagram 500 may be performed. In various embodiments, one or more of the operations of method 500 can be controlled or managed by software, by firmware, by hardware, or by any combination thereof, but is not limited to such. Method 500 can include processes of embodiments which can be controlled or managed by a processor(s) and electrical components under the control of computer or computing device readable and executable instructions (or code). The computer or computing device readable and executable instructions (or code) may reside, for example, in data storage features such as computer or computing device usable volatile memory, computer or computing device usable non-volatile memory, and/or computer or computing device usable mass data storage. However, the computer or computing device readable and executable instructions (or code) may reside in any type of computer or computing device readable medium.

In one embodiment, within a thin storage memory array that allows free memory space reclamation, there are some file system tasks or operations like defragmentation, resize, deleting large files, and the like which potentially can free up (or coalesce) large amounts of free memory space. During these file system operations, the file system has the knowledge of which memory areas are freed up. This file system information can be utilized by an embodiment in accordance with the present disclosure to intelligently issue a reclaim command on just the freed up memory areas. One of the benefits of this approach is the ability to reclaim a sizable portion of memory from the thin storage memory array within a relatively brief amount of time. In an embodiment in accordance with the present disclosure, a user of the file system can specify whether he or she wants it to perform a reclamation operation or process after an administrative task.

Specifically, method 500 can include determining whether an administrative task is to be performed for a file system within a thin storage memory array. If not, the determination can be repeated. However, if it is determined that an administrative task is to be performed for a file system within the thin storage memory array, a determination can be made automatically as to whether memory space is freed up (or coalesced) while performing the administrative task. If it is determine that no memory space was freed up while performing the administrative task, method 500 can repeat the determination of whether an administrative task is to be performed for a file system within the thin storage memory array. However, if it is determined that memory space was freed up while performing the administrative task, a determination can be made as to whether there are any free (or available) memory space adjoining any of the freed up memory space. If not, a determination can be made as to whether any freed up memory space satisfies a predefined contiguous memory space threshold. However, if it is determined that there are free memory space adjoining any of the freed up memory space, any adjoining free memory space can be incorporated (or included) with any of the freed up memory space. After which, the determination can be made as to whether any freed up memory space satisfies a predefined contiguous memory space threshold. If so, a determination can be made as to whether a memory space reclamation process is to be performed after the administrative task.

However, if it is determined that no freed up memory space satisfies the predefined contiguous memory space threshold, a determination can be made as to whether any freed up memory space is above a predefined percentage of the predefined contiguous memory space threshold. If not, method 500 can repeat the determination of whether an administrative task is to be performed for a file system within the thin storage memory array. However, if it is determined that any freed up memory space is above the predefined percentage of the predefined contiguous memory space threshold, the data present in occupied memory space near the freed up memory space can be relocated in order to satisfy the predefined contiguous memory space threshold. After which, the determination can be made as to whether the memory space reclamation process is to be performed after the administrative task. If not, method 500 can repeat the determination of whether an administrative task is to be performed for a file system within the thin storage memory array. However, if it is determined that a memory space reclamation process is to be performed after the administrative task, the freed up memory space that satisfied the predefined contiguous memory space threshold can be intelligently reclaimed from the file system within the thin storage memory array. In this manner, freed up memory space can be automatically reclaimed after a file system administrative task in accordance with various embodiments of the present disclosure.

At operation 502 of FIG. 5, a determination can be made as to whether an administrative task or operation is to be performed for a file system within a thin storage memory array (also known as a thin provisioning storage memory array). If not, method 500 proceeds to repeat operation 502. However, if it is determined at operation 502 that an administrative task or operation is to be performed for a file system within the thin storage memory array, method 500 can proceed to operation 504. It is pointed out that operation 502 can be implemented in a wide variety of ways. For example, operation 502 can be implemented in any manner similar to that described herein, but is not limited to such.

At operation 504, a determination can be made automatically as to whether memory space is freed up (or coalesced) while performing the administrative task. If not, method 500 can proceed to repeat operation 502. However, if it is determined at operation 504 that memory space was freed up while performing the administrative task, method 500 can proceed to operation 506. Note that the operation 504 can be implemented in a wide variety of ways. For example, operation 504 can be implemented in any manner similar to that described herein, but is not limited to such.

At operation 506 of FIG. 5, a determination can be made as to whether there are any memory space that are free (or available) that are adjoining (or adjacent to) any of the freed up memory space. If not, method 500 can proceed to operation 510. However, if it is determined at operation 506 that there are memory space that are free that are adjoining any of the freed up memory space, method 500 can proceed to operation 508. It is pointed out that operation 506 can be implemented in a wide variety of ways. For example, operation 506 can be implemented in any manner similar to that described herein, but is not limited to such.

At operation 508, any adjoining (or adjacent) free memory space can be incorporated (or included) with any of the freed up memory space. It is pointed out that operation 508 can be implemented in a wide variety of ways. For example, in an embodiment, at operation 508 any adjoining free (or available) memory space can be considered part of any of the freed up memory space. In one embodiment, at operation 508 any adjoining free memory space can be combined or summed with (and considered part of) any of the freed up memory space. Operation 508 can be implemented in any manner similar to that described herein, but is not limited to such.

At operation 510 of FIG. 5, a determination can be made as to whether any freed up memory space satisfies a predefined contiguous memory space threshold. If not, method 500 can proceed to operation 512. However, if it is determined at operation 510 that any freed up memory space satisfies the predefined contiguous memory space threshold, method 500 can proceed to operation 516. It is pointed out that any of the freed up memory space that satisfies the predefined contiguous memory space threshold at operation 510 may include adjoining free memory space that was included with any of the freed up memory space at operation 508. It is noted that operation 510 can be implemented in a wide variety of ways. For example in one embodiment, the predefined contiguous memory space threshold can be established at any value of memory space. Operation 510 can be implemented in any manner similar to that described herein, but is not limited to such.

At operation 512, a determination can be made as to whether any freed up memory space is above a predefined percentage of the predefined contiguous memory space threshold. If not, method 500 can proceed to operation 502. However, if it is determined at operation 512 that any freed up memory space is above the predefined percentage of the predefined contiguous memory space threshold, method 500 can proceed to operation 514. It is noted that any of the freed up memory space that is above the predefined percentage of the predefined contiguous memory space threshold at operation 512 may include adjoining free memory space that was included with any of the freed up memory space at operation 508. Note that operation 512 can be implemented in a wide variety of ways. For example, in an embodiment, the predefined percentage of the predefined contiguous memory space threshold can be established at any percentage value. In one embodiment, at operation 512 a determination can be made as to whether any freed up memory space is equal to or above a predefined percentage of the predefined contiguous memory space threshold. Operation 512 can be implemented in any manner similar to that described herein, but is not limited to such.

At operation 514 of FIG. 5, data present in occupied memory space near or adjoining or adjacent to the freed up memory space can be relocated in order to create enough contiguous freed up memory space that satisfies the predefined contiguous memory space threshold. It is pointed out that operation 514 can be implemented in a wide variety of ways. For example in one embodiment, at operation 514 one or more data stored in one or more memory space located near or adjoining or adjacent to the freed up memory space can be relocated in order to satisfy the predefined contiguous memory space threshold. Operation 514 can be implemented in any manner similar to that described herein, but is not limited to such.

At operation 516, a determination can be made as to whether a memory space reclamation process is to be performed after the administrative task or operation. If not, method 500 can proceed to operation 502. However, if it is determined at operation 516 that a memory space reclamation process is to be performed after the administrative task, method 500 can proceed to operation 518. It is noted that operation 516 can be implemented in a wide variety of ways. For example in an embodiment, a computer system can produce and present an interface at operation 516 to a user thereby enabling him or her to decide whether a memory space reclamation process is to be performed after the administrative task or operation. Note that operation 516 can be implemented in any manner similar to that described herein, but is not limited to such.

At operation 518 of FIG. 5, the freed up memory space that satisfies the predefined contiguous memory space threshold can be intelligently reclaimed from the file system within the thin storage memory array. Note that the freed up memory space that satisfies the predefined contiguous memory space threshold at operation 518 may include any memory space freed up during the performing of the administrative task, any adjoining free memory space produced at operation 508, any additional freed up memory space produced at operation 514, or any combination thereof, but is not limited to such. It is pointed out that operation 518 can be implemented in a wide variety of ways. For example in an embodiment, at operation 518 a reclaim command can be intelligently issued on just the freed up memory space or areas. In one embodiment, at operation 518 a disk area or storage Application Programming Interface (API) can be invoked to specifically reclaim the freed up memory space that satisfies the predefined contiguous memory space threshold. Operation 518 can be implemented in any manner similar to that described herein, but is not limited to such. After the completion of operation 518, method 500 can proceed to operation 502. In this manner, freed up memory space can be automatically reclaimed after a file system administrative task in accordance with various embodiments of the present disclosure.

Figure 6:
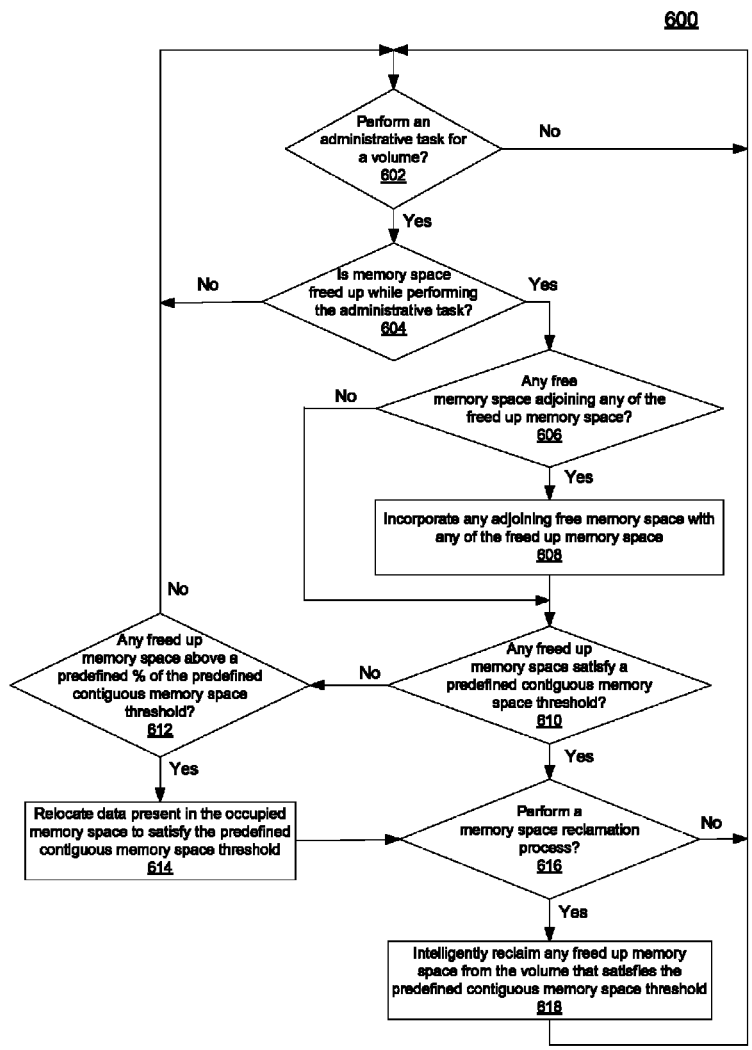
FIG. 6 is a flow diagram of still another method in accordance with various embodiments of the present disclosure.

FIG. 6 is a flow diagram of an example method (or process) 600 in accordance with various embodiments of the present disclosure for automatically reclaiming memory space after a volume administrative task. Although specific operations are disclosed in flow diagram 600, such operations are examples. Method 600 may not include all of the operations illustrated by FIG. 6. Also, method 600 may include various other operations and/or variations of the operations shown by FIG. 6. Likewise, the sequence of the operations of flow diagram 600 can be modified. It is appreciated that not all of the operations in flow diagram 600 may be performed. In various embodiments, one or more of the operations of method 600 can be controlled or managed by software, by firmware, by hardware, or by any combination thereof, but is not limited to such. Method 600 can include processes of embodiments which can be controlled or managed by a processor(s) and electrical components under the control of computer or computing device readable and executable instructions (or code). The computer or computing device readable and executable instructions (or code) may reside, for example, in data storage features such as computer or computing device usable volatile memory, computer or computing device usable non-volatile memory, and/or computer or computing device usable mass data storage. However, the computer or computing device readable and executable instructions (or code) may reside in any type of computer or computing device readable medium.

In one embodiment, within a thin storage array that allows free memory space reclamation, there are some volume manager operations like defragmentation, resize, deleting large files, and the like which potentially can free up (or coalesce) large amounts of free memory space. During these volume manager operations, the volume manager has the knowledge of which memory areas are freed up. This volume manager information can be utilized by an embodiment in accordance with the present disclosure to intelligently issue a reclaim command on just the freed up memory areas. One of the benefits of this approach is the ability to reclaim a sizable portion of memory from the thin storage array within a relatively brief amount of time. In an embodiment in accordance with the present disclosure, a user of the volume manager can specify whether he or she wants it to perform a reclamation operation or process after of an administrative task.

Specifically, method 600 can include determining whether an administrative task is to be performed for a volume within a thin storage memory array. If not, the determination can be repeated. However, if it is determined that an administrative task is to be performed for a volume within the thin storage memory array, a determination can be made automatically as to whether memory space is freed up (or coalesced) while performing the administrative task. If it is determine that no memory space was freed up while performing the administrative task, method 600 can repeat the determination of whether an administrative task is to be performed for a volume within the thin storage memory array. However, if it is determined that memory space was freed up while performing the administrative task, a determination can be made as to whether there are any free (or available) memory space adjoining any of the freed up memory space. If not, a determination can be made as to whether any freed up memory space satisfies a predefined contiguous memory space threshold. However, if it is determined that there are free memory space adjoining any of the freed up memory space, any adjoining free memory space can be incorporated (or included) with any of the freed up memory space. After which, the determination can be made as to whether any freed up memory space satisfies a predefined contiguous memory space threshold. If so, a determination can be made as to whether a memory space reclamation process is to be performed after the administrative task.

However, if it is determined that no freed up memory space satisfies the predefined contiguous memory space threshold, a determination can be made as to whether any freed up memory space is above a predefined percentage of the predefined contiguous memory space threshold. If not, method 600 can repeat the determination of whether an administrative task is to be performed for a volume within the thin storage memory array. However, if it is determined that any freed up memory space is above the predefined percentage of the predefined contiguous memory space threshold, the data present in occupied memory space near or adjacent to the freed up memory space can be relocated in order to satisfy the predefined contiguous memory space threshold. After which, the determination can be made as to whether the memory space reclamation process is to be performed after the administrative task. If not, method 600 can repeat the determination of whether an administrative task is to be performed for a volume within the thin storage memory array. However, if it is determined that a memory space reclamation process is to be performed after the administrative task, the freed up memory space that satisfied the predefined contiguous memory space threshold can be intelligently reclaimed from the volume within the thin storage memory array. In this manner, freed up memory space can be automatically reclaimed after a volume administrative task in accordance with various embodiments of the present disclosure.

At operation 602 of FIG. 6, a determination can be made as to whether an administrative task or operation is to be performed for a volume within a thin storage memory array (also known as a thin provisioning storage memory array). If not, method 600 can proceed to repeat operation 602. However, if it is determined at operation 602 that an administrative task or operation is to be performed for a volume within the thin storage memory array, method 600 can proceed to operation 604. It is noted that operation 602 can be implemented in a wide variety of ways. For example, operation 602 can be implemented in any manner similar to that described herein, but is not limited to such.

At operation 604, a determination can be made automatically as to whether memory space is freed up (or coalesced) while performing the administrative task. If not, method 600 can proceed to repeat operation 602. However, if it is determined at operation 604 that memory space was freed up while performing the administrative task, method 600 can proceed to operation 606. Note that the operation 604 can be implemented in a wide variety of ways. For example, operation 604 can be implemented in any manner similar to that described herein, but is not limited to such.

At operation 606 of FIG. 6, a determination can be made as to whether there are any memory space that are free (or available) that are adjoining (or adjacent to) any of the freed up memory space. If not, method 600 can proceed to operation 610. However, if it is determined at operation 606 that there are memory space that are free that are adjoining any of the freed up memory space, method 600 can proceed to operation 608. Note that operation 606 can be implemented in a wide variety of ways. For example, operation 606 can be implemented in any manner similar to that described herein, but is not limited to such.

At operation 608, any adjoining (or adjacent) free memory space can be incorporated (or included) with any of the freed up memory space. It is noted that operation 608 can be implemented in a wide variety of ways. For example in an embodiment, at operation 608 any adjoining free (or available) memory space can be considered part of any of the freed up memory space. In an embodiment, at operation 608 any adjoining free memory space can be combined or summed with (and considered part of) any of the freed up memory space. Operation 608 can be implemented in any manner similar to that described herein, but is not limited to such.

At operation 610 of FIG. 6, a determination can be made as to whether any freed up memory space satisfies a predefined contiguous memory space threshold. If not, method 600 can proceed to operation 612. However, if it is determined at operation 610 that any freed up memory space satisfies the predefined contiguous memory space threshold, method 600 can proceed to operation 616. Note that any of the freed up memory space that satisfies the predefined contiguous memory space threshold at operation 610 may include adjoining free memory space that was included with any of the freed up memory space at operation 608. It is noted that operation 610 can be implemented in a wide variety of ways. For example in an embodiment, the predefined contiguous memory space threshold can be established at any value of memory space. Operation 610 can be implemented in any manner similar to that described herein, but is not limited to such.

At operation 612, a determination can be made as to whether any freed up memory space is above a predefined percentage of the predefined contiguous memory space threshold. If not, method 600 can proceed to operation 602. However, if it is determined at operation 612 that any freed up memory space is above the predefined percentage of the predefined contiguous memory space threshold, method 600 can proceed to operation 614. It is noted that any of the freed up memory space that is above the predefined percentage of the predefined contiguous memory space threshold at operation 612 may include adjoining free memory space that was included with any of the freed up memory space at operation 608. It is noted that operation 612 can be implemented in a wide variety of ways. For example in one embodiment, the predefined percentage of the predefined contiguous memory space threshold can be established at any percentage value. In an embodiment, at operation 612 a determination can be made as to whether any freed up memory space is equal to or above a predefined percentage of the predefined contiguous memory space threshold. Operation 612 can be implemented in any manner similar to that described herein, but is not limited to such.

At operation 614 of FIG. 6, data present in occupied memory space near or adjoining or adjacent to the freed up memory space can be relocated in order to create enough contiguous freed up memory space that satisfies the predefined contiguous memory space threshold. Note that operation 614 can be implemented in a wide variety of ways. For example in an embodiment, at operation 614 one or more data stored in one or more memory space located near or adjoining or adjacent to the freed up memory space can be relocated in order to satisfy the predefined contiguous memory space threshold. Operation 614 can be implemented in any manner similar to that described herein, but is not limited to such.

At operation 616, a determination can be made as to whether a memory space reclamation process is to be performed after the administrative task or operation. If not, method 600 can proceed to operation 602. However, if it is determined at operation 616 that a memory space reclamation process is to be performed after the administrative task, method 600 can proceed to operation 618. It is pointed out that operation 616 can be implemented in a wide variety of ways. For example in one embodiment, a computer system can produce and present an interface at operation 616 to a user thereby enabling him or her to decide whether a memory space reclamation process is to be performed after the administrative task or operation. It is noted that operation 616 can be implemented in any manner similar to that described herein, but is not limited to such.

At operation 618 of FIG. 6, the freed up memory space that satisfies the predefined contiguous memory space threshold can be intelligently reclaimed from the volume within the thin storage memory array. It is pointed out that the freed up memory space that satisfies the predefined contiguous memory space threshold at operation 618 may include any memory space freed up during the performing of the administrative task, any adjoining free memory space produced at operation 608, any additional freed up memory space produced at operation 614, or any combination thereof, but is not limited to such. Note that operation 618 can be implemented in a wide variety of ways. For example in one embodiment, at operation 618 a reclaim command can be intelligently issued on just the freed up memory space or areas. In an embodiment, at operation 618 a disk area or storage Application Programming Interface (API) can be invoked to specifically reclaim the freed up memory space that satisfies the predefined contiguous memory space threshold. Operation 618 can be implemented in any manner similar to that described herein, but is not limited to such. After the completion of operation 618, method 600 can proceed to operation 602. In this manner, freed up memory space can be automatically reclaimed after a volume administrative task in accordance with various embodiments of the present disclosure.

Figure 7:
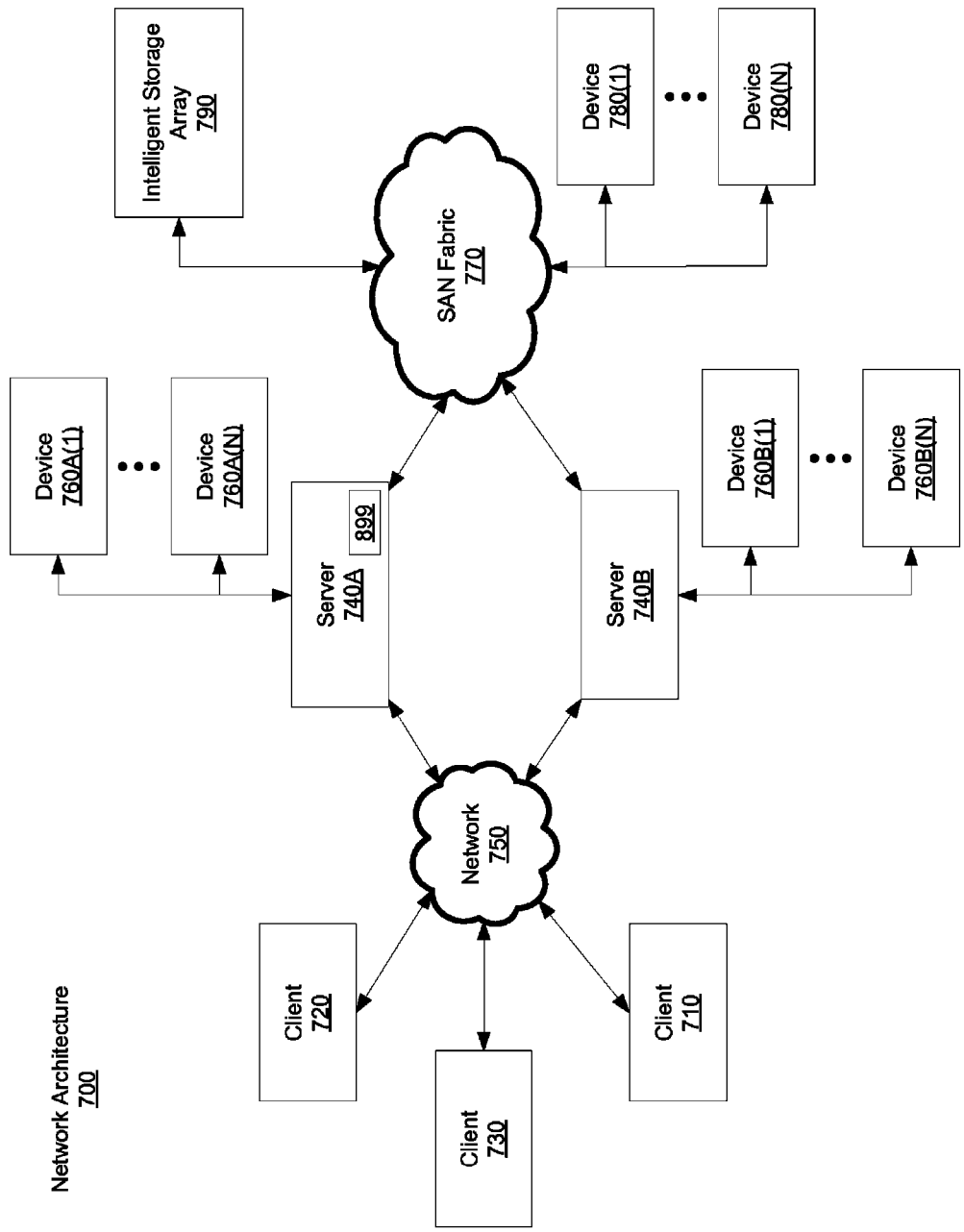
FIG. 7 is a block diagram depicting an example of a network upon which embodiments according to the present disclosure can be implemented.

FIG. 7 is a block diagram depicting a network architecture 700 upon which embodiments of the present disclosure may be used. The network architecture 700 can include client systems 710, 720, and 730, as well as storage servers 710A and 710B (any of which can be implemented using computer system 800 of FIG. 8), which are coupled to a network 750. Storage server 710A is further depicted as having storage devices 760A(1)-(N) directly attached, and storage server 710B is depicted with storage devices 760B(1)-(N) directly attached. Storage servers 710A and 710B are also connected to a SAN (storage area network) fabric 770, although connection to a storage area network is not required for operation of the disclosure. SAN fabric 770 supports access to storage devices 780(1)-(N) by storage servers 710A and 710B, and so by client systems 710, 720, and 730 via network 750. Intelligent storage array 790 is also shown as an example of a specific storage device accessible via SAN fabric 770.

Figure 8:
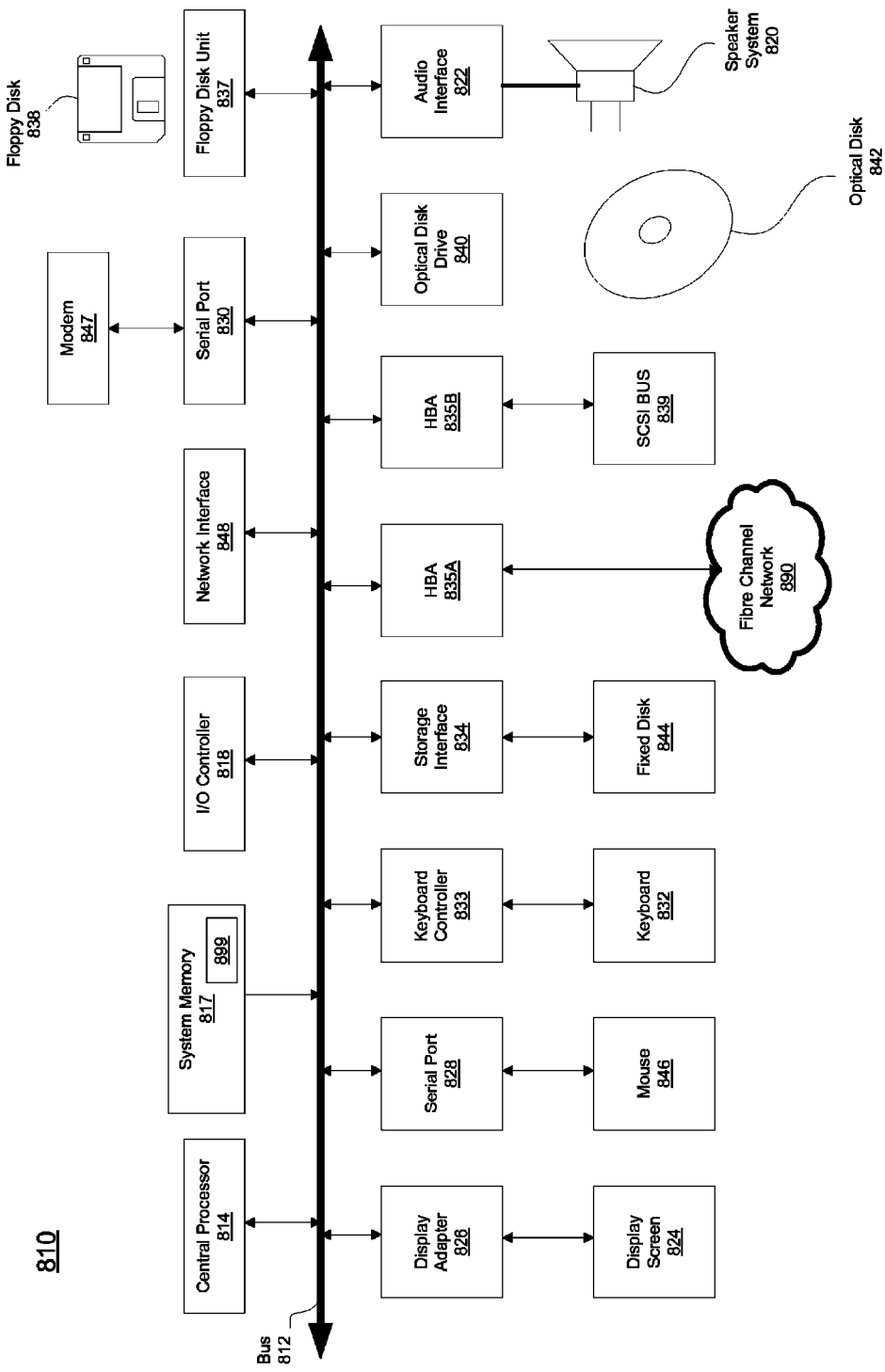
FIG. 8 is a block diagram depicting an example of a computer system upon which embodiments according to the present disclosure can be implemented.

With reference to computer system 810 of FIG. 8, modem 817, network interface 818 or some other method can be used to provide connectivity from each of client computer systems 710, 720, and 730 to network 750. Client systems 710, 720, and 730 are able to access information on storage server 710A or 7108 using, for example, a web browser or other client software (not shown). Such a client allows client systems 710, 720, and 730 to access data hosted by storage server 710A or 7108 or one of storage devices 760A(1)-(N), 760B(1)-(N), 780(1)-(N), or intelligent storage array 790. FIG. 7 depicts the use of a network such as the Internet for exchanging data, but the present disclosure is not limited to the Internet or any particular network-based environment.

Within FIG. 7, it is noted that one or more of the client systems 710, 720, and 730, and storage servers 710A and 710B can include a reclamation module 899 in accordance with various embodiments of the present disclosure. For example within the present embodiment, the storage server 710A can include a reclamation module 899. In one embodiment, the module 899 can cause the storage server 710A to implement free space reclamation on one or more of the storage devices 760A(1)-(N) in any manner similar to that described herein, but not limited to such. Furthermore, in an embodiment, the module 899 can cause the storage server 710A to implement free space reclamation in one or more file systems or volumes on one or more thin storage arrays.

It is noted that the network architecture 700 may not include all of the elements illustrated by FIG. 7. Additionally, the network architecture 700 can be implemented to include one or more elements not illustrated by FIG. 7. It is pointed out that the network architecture 700 can be utilized or implemented in any manner similar to that described herein, but is not limited to such.

FIG. 8 depicts a block diagram of a computer system 810 suitable for implementing embodiments of the present disclosure. In the discussion to follow, various and numerous components and elements are described. Various combinations and subsets of those components can be used to implement the devices mentioned in conjunction with FIG. 7. For example, the client 710 may be a full-function computer system that employs many if not all of the features of the computer system 810. However, the storage servers 710A and 710B may utilize a subset of those features needed to support the functionality provided by those devices. For example, the storage servers 710A and 710B may not need a keyboard or display, and may execute a relatively sparse operating system that supports the functionality of data storage and data access and the management of such functionality.

In the example of FIG. 8, the computer system 810 includes a bus 812 which interconnects major subsystems of the computer system 810. These subsystems can include, but is not limited to, one or more central processors 811; a system memory 817; an input/output controller 818; an external audio device, such as a speaker system 820 via an audio output interface 822; an external device, such as a display screen 821 via display adapter 826; serial ports 828 and 830; a keyboard 832 (interfaced with a keyboard controller 833); a storage interface 831; a floppy disk drive 837 operative to receive a floppy disk 838; a host bus adapter (HBA) interface card 835A operative to connect with a Fibre Channel network 890; an HBA interface card 835B operative to connect to a Small Computer System Interface (SCSI) bus 839; and an optical disk drive 810 operative to receive an optical disk 812. Also included are a mouse 816 (or other point-and-click device, coupled to bus 812 via serial port 828); a modem 817 (coupled to bus 812 via serial port 830); and a network interface 818 (coupled directly to bus 812). In one embodiment, the modem 817, network interface 818 or some other method can be used to provide connectivity from each of the client computer systems 710, 720, and 730 to the network 750 of FIG. 7.

The bus 812 of FIG. 8 allows data communication between the central processor 811 and system memory 817, which may include non-volatile memory (e.g., read only memory (ROM), programmable ROM, flash memory, electrically erasable programmable read only memory (EEPROM), and the like) or volatile memory (e.g., random access memory (RAM), static RAM, dynamic RAM, and the like) or some combination of non-volatile memory and volatile memory. The volatile memory is generally the main memory into which the operating system and application programs are loaded. The non-volatile memory can contain, among other code, the Basic Input-Output System (BIOS) which controls basic hardware operation such as the interaction with peripheral components.

Applications resident within the computer system 810 are generally stored on and accessed via a computer-readable storage medium, such as a hard disk drive (e.g., the fixed disk 811), an optical drive (e.g., the optical drive 810), a floppy disk unit 837, or other storage medium. Applications can be in the form of electronic signals modulated in accordance with the application and data communication technology when accessed via network modem 817 or interface 818.

Continuing with reference to FIG. 8, storage interface 831, as with the other storage interfaces of computer system 810, can connect to a standard computer-readable storage medium for storage and/or retrieval of information, such as a fixed disk drive 811. The fixed disk drive 811 may be a part of the computer system 810, or it may be separate and accessed through other interface systems. The modem 817 may provide a direct connection to a remote server via a telephone link or to the Internet via an internet service provider (ISP). The network interface 818 may provide a direct connection to a remote server via a direct network link to the Internet via a POP (point of presence). The network interface 818 may provide such a connection using wireless techniques, including digital cellular telephone connection, Cellular Digital Packet Data (CDPD) connection, digital satellite data connection, or the like.

Many other devices or subsystems (not shown in FIG. 8) may be connected to the computer system 810 in a similar manner (e.g., document scanners, digital cameras, and the like). Conversely, all of the devices shown in FIG. 8 need not be present to practice the present disclosure. In addition, it is noted that the devices and subsystems of the computer system 810 can be interconnected in different ways from that shown in FIG. 8.

The operation of a computer system such as that shown in FIG. 8 is readily known in the art and is not discussed in detail in this application. The operating system provided on the computer system 810 may be MS-DOS®, MS-WINDOWS®, OS/2®, UNIX®, Linux®, or another known operating system. Code to implement the present disclosure can be stored in computer-readable storage media such as one or more of the system memory 817, fixed disk 811, optical disk 812, or floppy disk 838. For example, the system memory 817 is shown storing a reclamation module 899 in accordance with various embodiments of the present disclosure. However, the reclamation module 899 can also be stored in computer-readable storage media such as one or more of the system memory 817, fixed disk 811, optical disk 812, or floppy disk 838. It should further be noted, that in an embodiment, the computer system 810 can have some, most, or all of its functionality supplanted by a distributed computer system having a large number of dispersed computing nodes, as would be the case where the functionality of the computer system 810 is partly or wholly executed using a cloud computing environment.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 9:
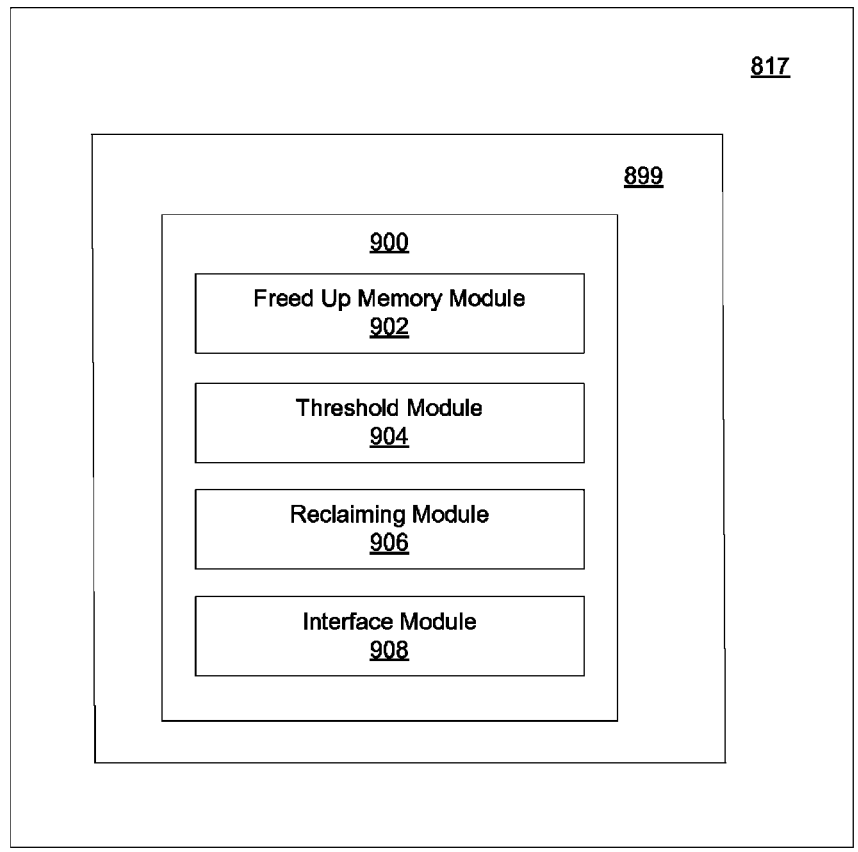
FIG. 9 is a block diagram of modules in accordance with various embodiments of the present disclosure.

FIG. 9 is a block diagram of an example module 900 in accordance with various embodiments of the present disclosure. In an embodiment, the module 900 can include instructions stored on a computer readable medium. In addition, the module 900 can be part of the module 899 (described herein), which may be stored within the system memory 817. The module 900 can include, but is not limited to, a freed up memory module 902, a threshold module 904, a reclaiming module 906, and an interface module 908.

Specifically, the freed up memory module 902 can include instructions for determining whether memory space is freed up while performing an administrative task (e.g., operation 104 or 304 or 504 or 604, and the like). Additionally, the freed up memory module 902 can include instructions for determining whether there are any free (or available) memory space adjoining (or adjacent to) any of the freed up memory space (e.g., operation 106 or 306 or 506 or 606, and the like). Also, the freed up memory module 902 can include instructions for incorporating (or including) any adjoining (or adjacent) free memory space with any of the freed up memory space (e.g., operation 108 or 308 or 508 or 608, and the like). The threshold module 904 can include instructions for determining whether any freed up memory space satisfies a predefined contiguous memory space threshold (e.g., operation 110 or 310 or 510 or 610, and the like). Moreover, the threshold module 904 can include instructions for determining whether any freed up memory space is at or above a predefined percentage of the predefined contiguous memory space threshold (e.g., operation 512 or 612, and the like). Furthermore, the threshold module 904 can include instructions for relocating data present in occupied memory space near or adjoining or adjacent to the freed up memory space to satisfy the predefined contiguous memory space threshold (e.g., operation 514 or 614, and the like).

The reclaiming module 906 of FIG. 9 can include instructions for intelligently reclaiming freed up memory space that satisfies the predefined contiguous memory space threshold (e.g., operation 114 or 314 or 518 or 618, and the like). The interface module 908 can include instructions for producing an interface (e.g., GUI) to determine whether a memory space reclamation process is to be performed after the administrative task or operation (e.g., operation 112 or 312 or 516 or 616, and the like). It is appreciated that the freed up memory module 902, the threshold module 904, the reclaiming module 906, and the interface module 908 can be implemented as part of a variety of environments. For example, the freed up memory module 902, the threshold module 904, the reclaiming module 906, and the interface module 908 can be implemented as part of, but not limited to, a distributed computing environment, a cloud computing environment, a client server environment, etc.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method comprising:
   determining whether an administrative task for a file system is to be performed within a thin storage memory array;
   if the administrative task for the file system is to be performed, determining whether memory space is freed up while performing the administrative task;
   if memory space is freed up while performing the administrative task, determining whether the freed up memory space satisfies a predefined contiguous memory space threshold;
   if the predefined contiguous memory space threshold is satisfied by the freed up memory space, determining whether a memory space reclamation process is to be performed; and
   if the memory space reclamation process is to be performed, reclaiming the freed up memory space from the file system.

2. The method of claim 1, wherein the method further comprising:
   if the predefined contiguous memory space threshold is not satisfied by the freed up memory space, determining whether the freed up memory space is at or above a predefined percentage of the predefined contiguous memory space threshold.

3. The method of claim 2, wherein the method further comprising:
   if the freed up memory space is at or above a predefined percentage of the predefined contiguous memory space threshold, relocating data stored in memory space located adjacent to the freed up memory space to satisfy the predefined contiguous memory space threshold.

4. The method of claim 1, wherein the method further comprising:
   if the memory space is freed up while performing the administrative task, determining whether there is a free memory space adjoining the freed up memory space.

5. The method of claim 4, wherein the method further comprising:
   if there is a free memory space adjoining the freed up memory space, including the adjoining free memory space with the freed up memory space.

6. The method of claim 1, wherein the administrative task is selected from a group consisting of resizing the file system, defragmenting the file system, removing a file from the file system, removing a file set from the file system, removing a clone from the file system, removing a snapshot from the file system, moving a file out of the file system within a Hierarchical Storage Management (HSM) environment, and moving a file of the file system from a thin tier to a non-thin tier within a Dynamic Storage Tiering (DST) environment.

7. The method of claim 1, wherein the administrative task is selected from a group consisting of compressing a file of the file system and compacting a directory of the file system.

8. The method of claim 1, wherein the file system is a log structured file system and wherein the administrative task comprises running a garbage collector within the log structured file system.

9. A non-transitory computer readable storage medium having stored thereon, computer-executable instructions that when executed by a computing device cause the computing device to perform a method comprising:
   determining whether an administrative task for a file system is to be performed within a thin storage memory array;
   if the administrative task for the file system is to be performed, determining whether memory space is freed up while performing the administrative task;
   if memory space is freed up while performing the administrative task, determining whether the freed up memory space satisfies a predefined contiguous memory space threshold;
   if the predefined contiguous memory space threshold is satisfied by the freed up memory space, determining whether a memory space reclamation process is to be performed; and
   if the memory space reclamation process is to be performed, reclaiming the freed up memory space from the file system.

10. The non-transitory computer readable storage medium of claim 9, wherein the method further comprising:
    if the predefined contiguous memory space threshold is not satisfied by the freed up memory space, determining whether the freed up memory space is at or above a predefined percentage of the predefined contiguous memory space threshold.

11. The non-transitory computer readable storage medium of claim 10, wherein the method further comprising:
    if the freed up memory space is at or above a predefined percentage of the predefined contiguous memory space threshold, relocating data stored in memory space located adjacent to the freed up memory space to satisfy the predefined contiguous memory space threshold.

12. The non-transitory computer readable storage medium of claim 9, wherein the method further comprising:
    if memory space is freed up while performing the administrative task, determining whether there is a free memory space adjoining the freed up memory space.

13. The non-transitory computer readable storage medium of claim 12, wherein the method further comprising:
    if there is a free memory space adjoining the freed up memory space, including the adjoining free memory space with the freed up memory space.

14. The non-transitory computer readable storage medium of claim 9, wherein the administrative task is selected from a group consisting of resizing the file system, defragmenting the file system, removing a file from the file system, removing a file set from the file system, removing a clone from the file system, removing a snapshot from the file system, moving a file out of the file system within a Hierarchical Storage Management (HSM) environment, and moving a file of the file system from a thin tier to a non-thin tier within a Dynamic Storage Tiering (DST) environment.

15. The non-transitory computer readable storage medium of claim 9, wherein the administrative task is selected from a group consisting of compressing a file of the file system and compacting a directory of the file system.

16. The non-transitory computer readable storage medium of claim 9, wherein the file system is a log structured file system and wherein the administrative task comprises running a garbage collector within the log structured file system.

17. A computer system comprising:
    a processor; and
    computer readable storage media coupled to the processor and having stored therein instructions that, if executed by the computer system cause the computer system to execute a method comprising:
      determining whether an administrative task for a file system is to be performed within a thin storage memory array;
      if the administrative task for the file system is to be performed, determining whether memory space is freed up while performing the administrative task;
      if memory space is freed up while performing the administrative task, determining whether the freed up memory space satisfies a predefined contiguous memory space threshold;
      if the predefined contiguous memory space threshold is satisfied by the freed up memory space, determining whether a memory space reclamation process is to be performed; and
      if the memory space reclamation process is to be performed, reclaiming the freed up memory space from the file system.

18. The computer system of claim 17, wherein the method further comprising:
    if the predefined contiguous memory space threshold is not satisfied by the freed up memory space, determining whether the freed up memory space is at or above a predefined percentage of the predefined contiguous memory space threshold.

19. The computer system of claim 18, wherein the method further comprising:
    if the freed up memory space is at or above a predefined percentage of the predefined contiguous memory space threshold, relocating data stored in memory space located adjacent to the freed up memory space to satisfy the predefined contiguous memory space threshold.

20. The computer system of claim 17, wherein the method further comprising:
    if the memory space is freed up while performing the administrative task, determining whether there is a free memory space adjoining the freed up memory space.

* * * * *